United States Patent [19]

Bradshaw et al.

[11] Patent Number: 5,068,534

[45] Date of Patent: Nov. 26, 1991

[54] HIGH RESOLUTION PLASMA MASS SPECTROMETER

[75] Inventors: Neil Bradshaw, Stockport; Neil E. Sanderson, Sandiway, both of United Kingdom

[73] Assignee: VG Instruments Group Limited, Haywards Heath, United Kingdom

[21] Appl. No.: 623,401

[22] PCT Filed: Jun. 5, 1989

[86] PCT No.: PCT/GB89/00622

§ 371 Date: Dec. 3, 1990

§ 102(e) Date: Dec. 3, 1990

[87] PCT Pub. No.: WO89/12313

PCT Pub. Date: Dec. 14, 1989

[30] Foreign Application Priority Data

Jun. 3, 1988 [GB] United Kingdom ................. 8813149

[51] Int. Cl.[5] ......................... B01D 59/44; H01J 49/00

[52] U.S. Cl. ..................................... 250/288; 250/296; 250/298

[58] Field of Search ............... 250/288, 281, 296, 298, 250/423 R; 315/111.81

[56] References Cited

U.S. PATENT DOCUMENTS 4,480,187 10/1984 Matsuda .............................. 250/296
4,740,696 4/1988 Osawa et al. ........................ 250/288
4,746,794 5/1988 French et al. ........................ 250/288
4,760,253 7/1988 Hutton ................................ 250/288
4,886,966 12/1989 Matsunaga et al. ................. 250/288
4,999,492 3/1991 Nakagawa ........................... 250/288

FOREIGN PATENT DOCUMENTS 112004 10/1983 European Pat. Off. .
199455 3/1986 European Pat. Off. .
62-4043 3/1987 Japan .

OTHER PUBLICATIONS

A. L. Gray, "The ICP as an Ion Source-Origins, Achievements, and Prospects", Spectrochimica Acta, 1985, vol. 40B, Nos. 10-12, pp. 1525-1537.

D. J. Douglas et al., "Inductively-Coupled Plasma Mass Spectrometry (ICP-MS)", Prog. Anal. Atom. Spectrosc., 1985, vol. 8, pp. 1-18.

A. L. Gray et al., "Langmuir Probe Potential Measurements in the Plasma and their Correlation with Mass Spectral Characteristics in Inductively Coupled Plasma Mass Spectrometry", Journal of Analytical Atomic Spectrometry, Feb. 1987, vol. 2, pp. 13-20.

J. A. Olivares, "Continuum Flow Sampling Mass Spectrometer for Elemental Analysis with an Inductively Coupled Plasma Ion Source", Ph.D. Thesis, Iowa State University, Ames Laboratory, Jun. 1985.

R. S. Houk et al., "Plasma Potential Measurements for Inductively Coupled Plasma Mass Spectrometry with a Centre-Tapped Load Coil", Journal of Analytical Atomic Spectrometry, Apr. 1987, vol. 2, pp. 283-286.

(List continued on next page.)

*Primary Examiner*—Bruce C. Anderson
*Attorney, Agent, or Firm*—Merchant, Gould, Smith, Edell, Welter & Schmidt

[57] ABSTRACT

There is disclosed a double-focusing mass spectrometer in which ions are generated from a sample in a microwave-induced or inductively-coupled plasma (3). Ions are sampled from the plasma (3) through an aperture in a sampling cone (19) and pass through a skimmer cone (28) and several electrostatic lenses (30,33) to the entrance slit of the mass analyzer. The sampling cone (19) and skimmer cone (28) are maintained by a power supply (40) at a potential approximately equal to the accelerating potential required by the mass analyzer. It is found that the plasma potential may be maintained at such a value that a substantial proportion of the ions generated in the plasma (3) have energies lying within the energy passband of the mass analyzer, so that a high sensitivity, high resolution mass spectrometer especially suitable for the elemental analysis of solid or liquid samples is provided. Such a spectrometer is capable of resolving many of the spectral interferences which restrict the usefulness of conventional quadrupole based plasma mass spectrometers.

17 Claims, 3 Drawing Sheets

OTHER PUBLICATIONS

Lu Pei-Qi et al., "Langmuir Probe Measurements of Electron Temperatures in an Inductively Coupled Plasma", Spectrochimica Acta., vol. 43B, No. 3, pp. 273-285, 1988.

A. L. Gray, "The Use of an Inductively Coupled Plasma as an Ion Source for Atomic Mass Spectrometry", Ph.D. Thesis (part), University of Surrey, Great Britain, 1982.

J. A. Olivares et al., "Ion Sampling for Inductively Coupled Plasma Mass Spectrometry", Anal. Chem., vol. 57, 1985, pp. 2674-2679.

G. Peter et al., "Summary Abstract: Mass and Energy Analysis of Ions from Plasmas", J. Vac. Sci. Technol. A5 (4), p. 2285.

D. J. Douglas et al., "An Improved Interface for Inductively Coupled Plasma-Mass Spectrometry (ICP-MS)", Spectrochimica Acta, vol. 41B, No. 3, pp. 197-204.

R. S. Houk, "Mass Spectrometry of Inductively Coupled Plasmas", Analytical Chemistry, vol. 58, No. 1, Jan. 1986, pp. 97A-105A.

A. M. Grange et al., "Medium Resolution Atmospheric Pressure Ionization Mass Spectrometer", Rev. Sci. Instrum., vol. 59, No. 4, Apr. 1988, pp. 197-204.

Pierre Communay, "Analysis of an Ion Beam from an Inductively Coupled h.f. Source. A method of Measuring the Optical Parameters of the Gun from the Energy Spectrum only." Optik, vol. 51, No. 4, 1978, pp. 369-384.

B. Lehmann, "Dissoziation von $H_2^+$ and $H_2^+$ Beim Stro and Kr im Energiebereich 6-60 keV", Z. Naturforsch, 1976, vol. 31A, No. 11, pp. 1303-1307.

HIGH RESOLUTION PLASMA MASS SPECTROMETER

This invention relates to a mass spectrometer in which ions are generated from a sample by means of a microwave or inductively coupled plasma (MIP or ICP, respectively).

Mass spectrometers having an ion source comprising such a plasma can be used for the determination of the elemental composition of a sample dissolved in a solution. In such a spectrometer, the solution is introduced by means of a nebulizer through which a controlled flow of inert gas is passed. This gas is subsequently introduced into the plasma. Several types of plasma have been described, the most common ones being an inductively coupled plasma similar to those used in atomic emission spectroscopy, or a microwave plasma (see, for example, Gray, Spectrochimica Acta, 1985, vol. 40B (10–12) pp 1525–37 and Douglas and Houk, Prog. Analyt. Atom. Spectrosc. 1985, vol 8, 1–18).

In prior spectrometers a quadrupole mass analyzer is employed, interfaced to the plasma by a molecular beam sampling system. The plasma is generated adjacent to a cooled first (or sample) cone containing in its apex a small hole leading to a first evacuated region. A second (or skimmer) cone, also having a hole at its apex, is located downstream of the first cone and divides the first evacuated region from a second evacuated region in which the quadrupole mass analyzer is situated. The second cone and the first evacuated region comprise a conventional pressure reduction stage. Conventionally the holes in the cones are aligned with the axis of the quadrupole mass analyzer, so that ions generated in the plasma pass through them into the mass analyzer. Various arrangements of electrostatic lenses are used to maximize the transmission of ions from the plasma into the analyzer.

The majority of the ions formed are singly charged ions of each of the elements present in the discharge, so that a mass spectrometer with such a source is a valuable instrument for determining the elemental composition of a sample, especially of inorganic materials such as metallic alloys or geological samples.

When the plasma is situated adjacent to the first (or sample) cone, a boundary layer of cooler gas is formed adjacent to its surface. This has a number of deleterious effects on the spectrum, increasing the background peaks and resulting in the formation of unwanted molecular species which cause spectral interferences. It also tends to cause arcing between the plasma and the cone, because the cool gas acts as an electrical insulator (see, e.g, EP 112004), allowing the potential of the plasma to rise to an undefined value.

If the hole in the cone is made larger, the boundary layer is "punctured" by virtue of the increased flow of gas through the aperture, so that arcing and the formation of the molecular species are reduced. However, not all workers report success with this approach. For example, Douglas, in EP 112004, describes an alternative arrangement for a RF ICP involving a grounded variable tap on the load coil which is adjusted to minimize the voltage swing in the plasma. Douglas claims that the boundary layer cannot be completely eliminated by enlarging the hole in the cone, and that the problem of the potential of the plasma being undefined results in "residual arcing" in any practical ICP MS instrument. See also Douglas and Houk (ibid).

A number of workers have investigated the variations in the potential of the plasma and other attempts have also been made to control it. Gray, Houk and Williams (J. Anal. Atom. Spectrom, 1987, vol.2, pp 13–20) measured the potential at various points in a typical plasma and report voltages of between −10 and +30v relative to ground with a grounded sample cone and RF coil. The actual voltages are certainly higher than the measured values because of the cooling of the plasma caused by the probe. Olivares (PhD Thesis, Iowa State University, 1985) attempted to measure the energy of ions produced in an inductively coupled plasma and found a similar range of values as the potential measurements of Gray, dependent on the plasma conditions. The higher than expected value was also assigned to residual arcing between the plasma and the sampling cone.

Similar problems were reported by Ishikawa in JP 62-64043 A1, who suggests that the problem can be eliminated by allowing the potential of the skimmer cone (as distinct from the sampling cone, which is in contact with the plasma) to float.

It is clear, therefore, that in prior ICPMS systems the plasma potential and the energy at which ions are formed is not directly determined by any simple potential and nor is it necessarily constant. It appears to be determined by an improperly understood combination of sampling and skimmer cone potentials, the plasma gas flows and operating conditions, including the nature of the sample, RF power and the geometry of the load coil and the position of its tap. As a consequence, it has not been thought possible to accurately control the ion energy and most work has been directed to preventing the residual arcing (eg EP 112004, JP 62-64043 A1) which is thought to be at the root of the problem.

ICP instruments are very sensitive and are often used for the determination of trace quantities. However, the presence of background peaks at certain masses reduces the sensitivity to certain elements when a background peak has the same nominal mass as the peak used to determine a particular isotope. Because the quadrupole mass analyzers used have only unit mass resolution they are incapable of resolving such interferences. Similarly, isotopes of different elements may also have the same nominal masses, making a precise analysis impossible in cases where both are present. A need therefore exists to interface an ICP or an MIP to a high resolution mass analyzer in order to deal with such cases. Further, use of a double focusing mass analyzer is likely to result in an increased transmission of ions in comparison with a quadrupole analyzer and consequently result in increased sensitivity.

Conventional magnetic sector high resolution analyzers require the ions to be analyzed to have a fixed energy of several keV. This is usually achieved by operating the ion source at a high positive potential and accelerating the ions through an earthed slit at the entrance of the analyzer to give them the required kinetic energy. Obviously, this approach cannot be adopted in the case of an ICP or an MIP in which the ions are generated in a plasma. It is the object of the present invention to provide an ICP or an MIP mass spectrometer incorporating a magnetic sector high resolution mass analyzer.

In accordance with this objective there is provided a mass spectrometer for the analysis of a sample comprising means for establishing a plasma discharge in an inert gas by means of an electrical field energized by a radio-frequency or microwave generator; means for introducing said sample into said plasma discharge; a sampling cone disposed adjacent to said plasma and having an aperture in its apex; a mass analyzer disposed to receive at least some of the ions generated in said plasma which pass through said aperture; and means for maintaining the pressure on the side of said sampling cone remote from said plasma substantially below atmospheric pressure, characterized in that said mass analyzer comprises at least a magnetic sector analyzer having an entrance slit, and including means for maintaining a potential difference between said sampling cone and said entrance slit of such a magnitude that the energy of the ions after they have passed through said entrance slit permits their mass analysis by said magnetic sector analyzer.

Further preferably, a skimmer cone is provided between the entrance slit of the mass analyzer and the sampling cone, and an additional stage of differential pumping is provided between the skimmer cone and the entrance slit. In this case the space between the sampling cone and the skimmer cone may be evacuated by a mechanical rotary pump to a pressure of several mm Hg, and the space between the skimmer cone and the entrance slit evacuated by a diffusion pump to a pressure of about $10^{-4}$ mm Hg. Preferably both the sampling cone and the skimmer cone are maintained at the same potential. Various electrostatic lenses may also be disposed between the sampling cone and the entrance slit to provide efficient transfer of the ions to the mass analyzer. Conveniently, at least one of these lenses comprises a multipole lens (preferably a quadrupole) adapted to change the cross section of the ion beam from circular to substantially rectangular as it travels between said sampling cone and said entrance slit.

In a spectrometer according to the invention it has been surprisingly found that the potential at which the ions are formed in the plasma is substantially fixed in relation to the sample cone potential, even though the two potentials may differ by up to a few tens of volts. Consequently, the energy of the ions passing through the aperture can be substantially fixed at the value required by the mass analyzer by suitably adjusting the potential of the sample cone. The ion energy is found to be sufficiently independent of the plasma operating conditions to allow stable operation of even a double-focusing instrument for long periods. The sensitivity of a double-focusing instrument according to the invention is found to be about 10 times higher than that of a quadrupole mass analyzer operating under otherwise similar conditions, which indicates that a substantial proportion of the ions sampled from the plasma have energies within a few electron-volts of each other, because only ions having energies within that range can be transmitted through the analyzer.

It therefore appears that if the sampling cone is maintained close to the accelerating voltage of the spectrometer the plasma potential can be set to a value sufficiently constant to permit effective analysis by a double-focusing mass spectrometer, in contrast to the prior observations made in connection with quadrupole instruments. This is all the more surprising in view of the preferred method of operating with the RF load coil of the ICP connected to ground at the end of the coil nearest to the sampling cone, and not operating at high potential as might have been thought necessary in view of EP 112004. Indeed it appears from the preliminary experiments so far carried out by the inventors that the spread of ion energies with the sample cone potential at 4kV is actually smaller than it is with the sample cone grounded.

Preferably the size of the aperture is selected so that the boundary layer of cool gas adjacent to the sample cone is punctured. It has been found that this minimizes the potential gradient between the plasma and the cone. Preferably the entrance slit of the mass spectrometer is maintained substantially at ground (earth) potential, and a power supply is provided for maintaining the sample cone at a potential (with respect to ground) approximately equal to the accelerating potential required by the mass analyzer; the sample cone is insulated to allow the potential to be maintained.

Preferably also a vacuum of 2–4 mm Hg is maintained in the region immediately behind the sample cone and the aperture comprises a cylindrical hole approximately 1 mm in diameter and 0.7 mm deep. Preferably also the cone is made of nickel, and has external and internal angles of approximately 120° and 116° respectively. It has been found that the stability of the ion energy is critically dependent on the geometry of the plasma and the cone, and some experimentation may be necessary to optimize the performance. When, as is preferred, a conventional double-focusing mass analyzer is employed, a potential of approximately +4 to +8kV is applied to the sample cone and the analyzer entrance slit is grounded. The potential applied to the sample cone is typically within ±10 volts of the accelerating potential of the spectrometer and may be selected by adjustment for the maximum transmission of ions through the analyzer.

Apart from the requirement to insulate the sample cone, and the provision of electrostatic lenses to transmit the ion beam efficiently from the cone to the entrance slit of the spectrometer, the remainder of the apparatus is similar to that used for a conventional ICP or MIP mass spectrometer, with the quadrupole analyzer replaced by a double focusing spectrometer. In this way, spectral interferences can be resolved by operating at high resolution and the sensitivity and selectivity of the technique greatly enhanced.

The invention will now be described in greater detail by way of example only and by reference to the following figures, in which.

Figure 1:
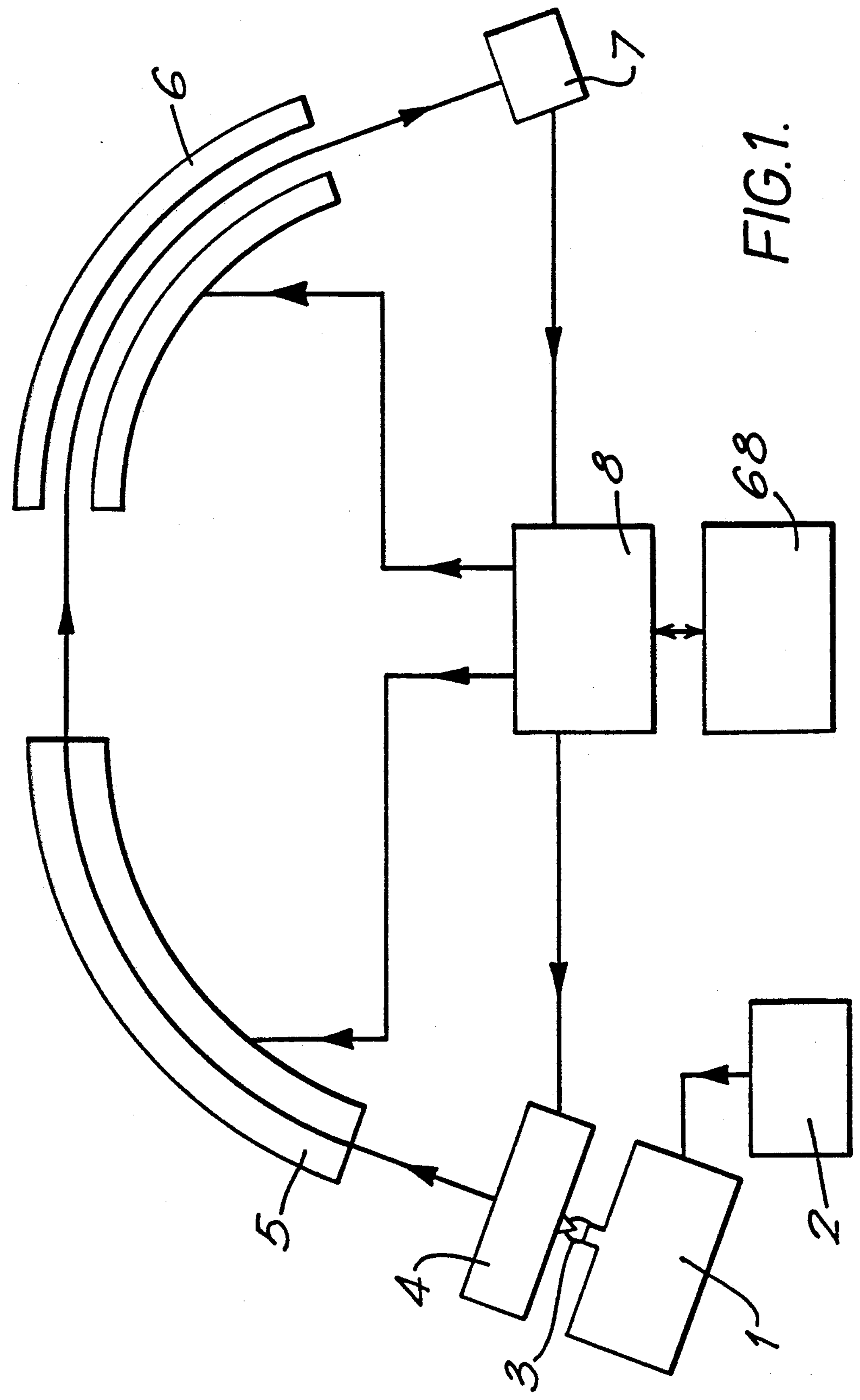
FIG. 1 is a schematic drawing of a double-focusing mass spectrometer according to the invention.

Referring first to FIG. 1, a largely conventional inductively coupled plasma torch assembly 1 which is fed by a gas supply and sample introduction unit 2 generates a plasma 3 in which ions characteristic of the elements present in a sample are formed. Ions formed in plasma 3 are sampled by the mass spectrometer sampling system 4 and pass into a conventional double-focusing mass analyzer comprising a magnetic sector analyzer 5, an electrostatic analyzer 6, and an ion detector 7. A power supply unit and signal processor 8 provides the necessary electrical supplies for the various parts of the spectrometer including the sampling system 4, the magnetic sector 5 and electrostatic analyzer 6, and receives and processes a signal from ion detector 7. A digital computer 68 controls the power supply unit 8 and also processes the output of the ion detector 7 to present the mass spectral data in a convenient form.

All the parts of the complete spectrometer indicated in FIG. 1 with the exception of the sampling system 4 are similar or identical to conventional prior components. Sampling system 4 is described in detail below, and some modifications, also described below, are required to the torch assembly 1. The programming of the computer 68 is also modified to present the high resolution mass spectrometric data in a form most suited to the elemental analysis of a sample.

Figure 2:
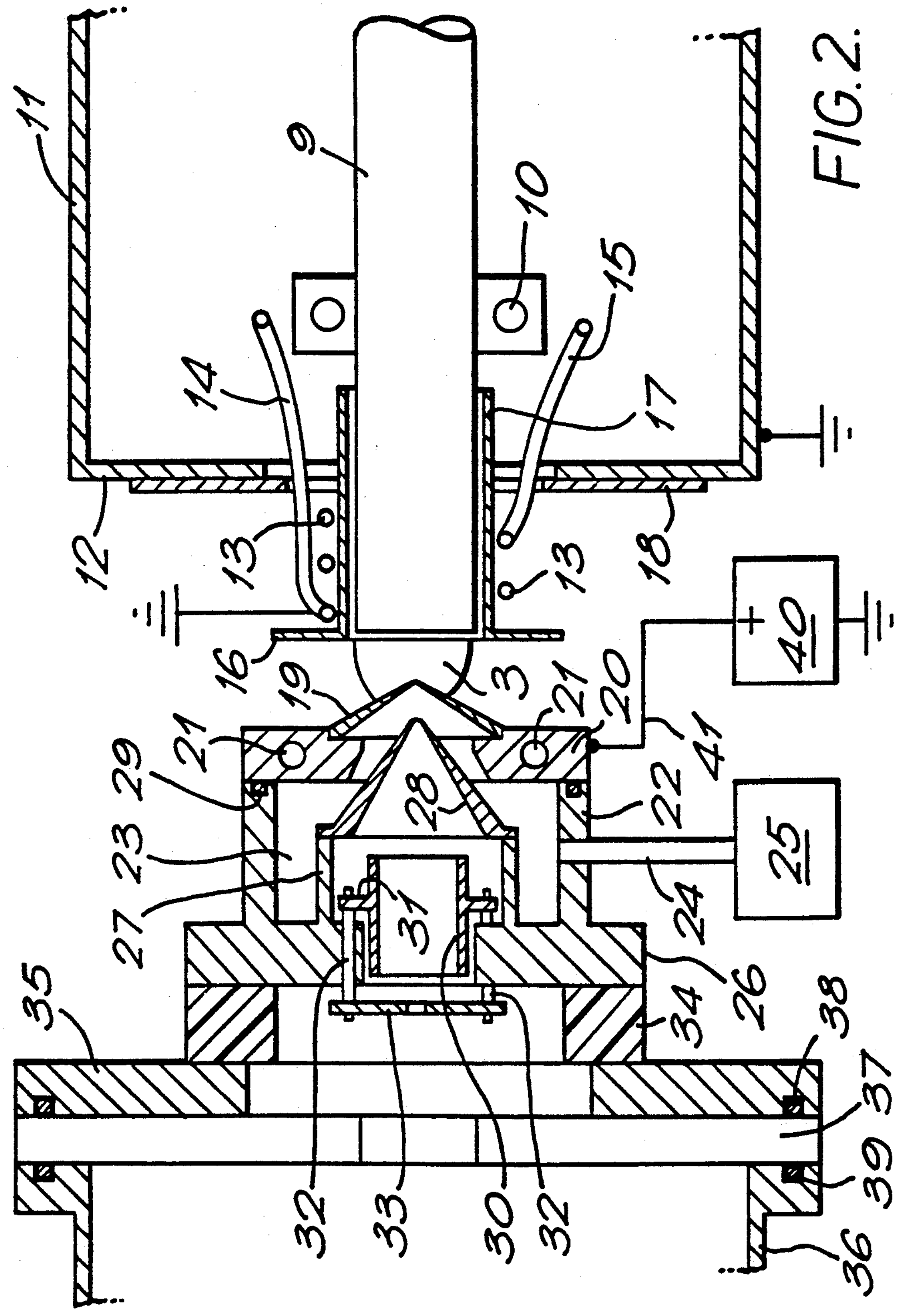
FIG. 2 is a sectional drawing of the plasma generator and sample system of the mass spectrometer of FIG. 1.
Figure 3:
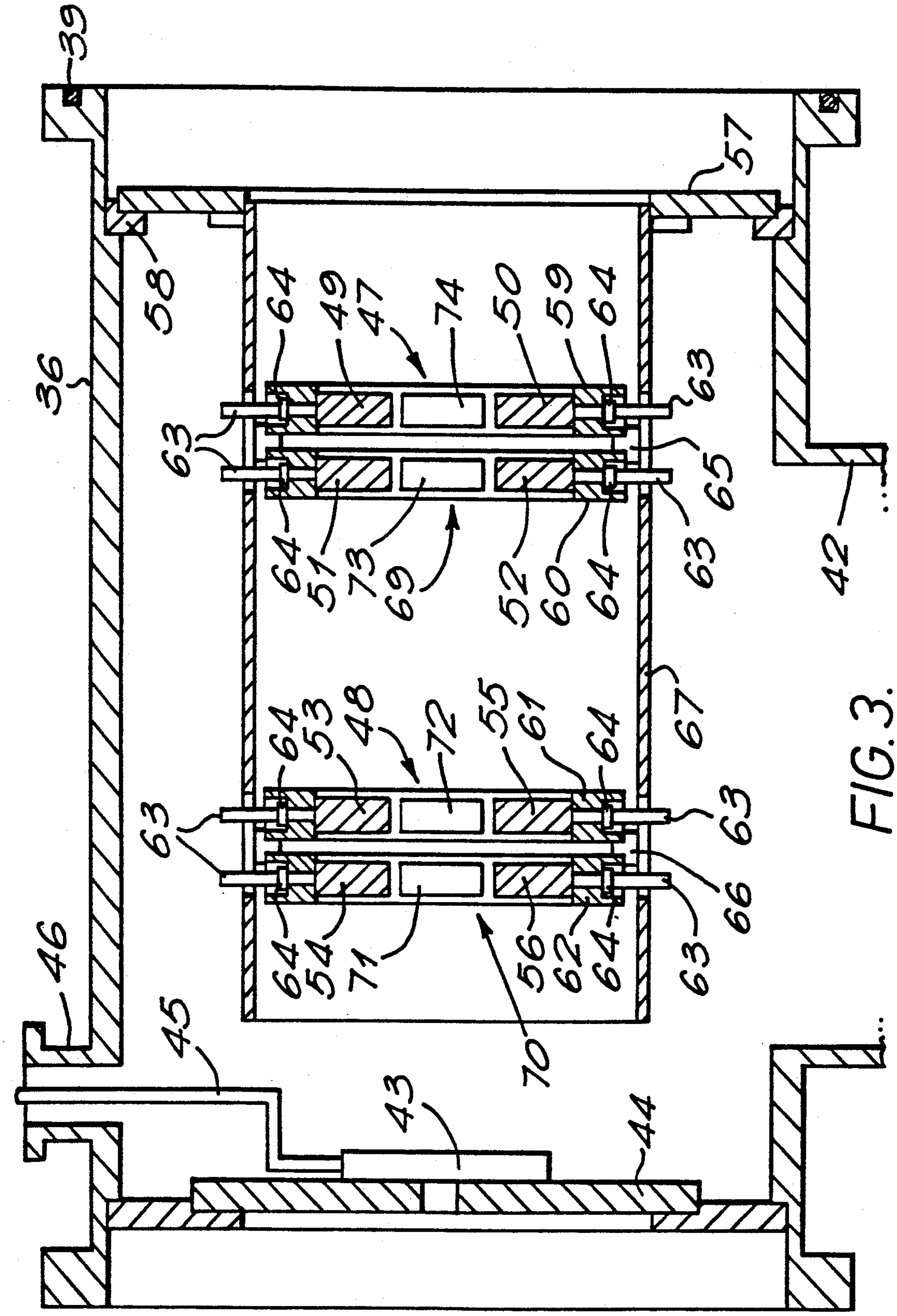
FIG. 3 is a sectional drawing of a system of electrostatic lenses suitable for use in the spectrometer of FIG. 1.

The mass spectrometer sampling system is illustrated in more detail in FIGS. 2 and 3. A conventional inductively-coupled plasma torch 9 is fixed by a mounting clamp 10 inside a metal torch box 11 but is arranged to protrude from the front face 12 of the torch box 11 by rather more (typically 25-35 mm) than in a conventional ICP torch box assembly. Consequently the RF load coil 13, typically comprising about 2½turns of copper pipe through which water is circulated, is mounted so that at least part of it is outside the box 11. The coil is extended by tubes 14 and 15 to connect to the output terminals of the RF power generator (not shown) inside box 11. A quartz bonnet, comprising a cylindrical portion 17 and a flat circular portion 16, is a push fit between the torch 9 and the RF load coil 13 as shown.

By arranging for the torch 9 to protrude from the box 11 in this way a greater distance can be maintained between the mass spectrometer sampling cone 19 and the front face 12 of the torch box 11. This is necessary to prevent the possibility of arcing between the cone 19, which may be maintained at 4kV or higher, and the front fact 12 which is earthed. Similarly, an insulator 18 comprising a ceramic disc is clamped to the front face 12 to further reduce the risk of arcing.

The RF load coil 13 is grounded at the point closest to the front of torch 9 where the plasma 3 is formed. This coil is shielded from the sampling cone 19 by means of the quartz bonnet 16.

The sampling cone 19 is made from nickel and has an external angle of 120° and an internal angle of 116°. The hole in its apex is approximately 1.0 mm diameter and has parallel sides approximately 0.7 mm deep extending between the outer and inner parts. As such it is relatively conventional. It is mounted on a front plate 20 which contains several drilled passages 21 through which water is circulated to cool the plate 20 and the sampling cone 19.

Front plate 20 is mounted on the body 22 of an expansion chamber 23, which is evacuated through pipe 24 by a large (28 $m^3$/hour) mechanical rotary pump 25. The pipe 24 may conveniently comprise a section of 25 mm diameter wire-reinforced vacuum hose. Because body 22 is maintained at a high potential (see below) and the gas inside the expansion chamber 23 is typically at a pressure of a few mm Hg and therefore electrically conductive, it is necessary to insulate the pump 25 from ground and obtain its electrical power supply from an isolating transformer which will withstand the voltage applied to the body 22.

Body 22 comprises a flat circular flange 26, an outer circular portion and a concentrically disposed inner circular portion 27 which supports a skimmer cone 28. The front plate 20 is sealed to the outer circular portion by means of an 'O' ring 29 and comprises a tapered central orifice through which the skimmer cone 28 protrudes as shown.

A hollow cylindrical lens element 30 to which three external mounting lugs 31 are welded is supported on insulated mountings 82 from the base of flange 26 of body 22, and extends through a hole in flange 26 as shown. An electrical feedthrough (not shown) is provided in body 22 to facilitate electrical connection to the lens element 30. The insulated mountings 32 extend through the base flange 26 and support a second lens element 33 which comprises a flat circular disc with a central circular aperture. A second feedthrough (not shown) is provided in body 22 for this lens element.

The base flange 26 of body 22 is secured to a circular insulating flange 34 made of PTFE which in turn is supported from a metallic flange 35 of a transfer lens vacuum housing 36. A vacuum isolating slide valve 37 is provided between the front flange 35 and the housing 36 to facilitate maintenance. 'O' rings 38 and 39 are respectively used to seal the flange 35 to the slide valve 37 and the valve 37 to housing 36, as shown.

Body 22, the sampling cone 19, front plate 20 and the skimmer cone 28 are all maintained at approximately the accelerating voltage required by the mass analyzer by a high voltage power supply 40 connected by lead 41 to the front plate 20. Power supply 40 is part of unit 8 (FIG. 1) and has an output voltage adjustable within a range of a few tens of volts of the required accelerating potential. It is set to ensure optimum transmission of ions from the plasma through the mass analyzer, and the optimum value will differ from the true accelerating potential by the average additional energy of the ions formed in the plasma. As discussed, this has been found to be surprisingly constant and therefore allows the efficient transmission of ions through the mass analyzer with relatively few ions being lost by virtue of their energy being outside the "ion-energy window" of the analyzer.

It will be appreciated that because the front plate 20 is maintained at a high potential relative to ground, the water circulated through the passages 21 must be of very high purity, typically doubly deionized, and the connections between the chiller and passages 21 made by means of insulated tubing. Use of very high purity water obviates the need to float the chiller unit and provide another isolated supply.

Ions from the plasma 3 pass through the apertures in the sampling cone 19 and skimmer cone 28 and are focused by the cylindrical lens element 30 and the second lens element 33 into beam shaping lenses in the housing 36 (described below). This arrangement of lens elements 30 and 33 is similar to that used in a conventional quadrupole ICP mass spectrometer, but the potentials applied to them are of course greatly different. The potentials may be derived from an adjustable potential divider connected across the high voltage power supply 40, and are selected to optimize transmission of ions into the analyzer.

Referring next to FIG. 3, the vacuum housing 36 comprises a large diameter pumping port 42 which is connected to a 700 $1.s^{-1}$ diffusion pump (not shown), which maintains the pressure in housing 36, and the interiors of insulator 34 and body 22 behind the skimmer cone 28 at approximately $10^{-4}$ mm Hg. Vacuum housing 36 can be isolated from the sampling assembly by means of the slide valve 37, thereby eliminating the need to allow the diffusion pump to cool when, for example, changing the sample cone 19.

At the opposite end of the housing 36 to slide valve 37 is positioned the entrance slit 43 of the conventional double-focusing mass analyzer comprising the magnetic sector analyzer 5 and the electrostatic analyzer 6. Slit 43 is mounted on a diaphragm flange assembly 44 fitted inside the housing 36 and isolates the mass spectrometer high vacuum system from the pressure of $10^{-4}$ mm Hg present in vacuum housing 36. Slit 43 is of the adjustable width variety, operated by a push rod 45 which in turn is operated from a bellows-sealed micrometer drive (not shown) fitted to the port 46 on housing 36. This arrangement is conventional on most double-focusing spectrometers.

In order to efficiently transmit ions through the instrument it is necessary to change the shape of the ion beam from a circular cross section (which it possesses as it leaves skimmer cone 28) to a rectangular cross section, preferably of the same aspect ratio as the entrance slit 43, at least as far as is practical. This is achieved in a relatively conventional way by means of four quadrupole lens assemblies 47,48,69 and 70, disposed as shown in the figure. These are operated in a conventional way in conjunction with the lens elements 30 and 33 to convert the circular cross section beam from elements 30 and 33 to a substantially rectangular image on the entrance slit 43.

The lens assemblies 47,48,69 and 70 are mounted on a support tube 67 which in turn is attached to a flange 57. This is bolted to a flange 58 (welded inside housing 36) which contains a hole large enough to allow the entire lens assembly to be withdrawn. Each lens assembly comprises four short circular cross-section rod electrodes (eg, 49–56, 71–74) which are mounted from a ceramic support insulator 59–62 by means of studding 63 secured by a nut and washer 64 in a recess in the insulator. The rods are disposed so that their axes are parallel to the axis of the support tube 67 and so that imaginary lines joining the centers of oppositely disposed rods in each lens are parallel to the boundaries of the entrance slit 43. Each of the circular support insulators is clamped against a recessed flange 65, 66 fitted inside the support tube 67. Studding 63 is also used to make electrical connections to the electrodes (eg, 49–56 and 71–74) via feedthroughs (not shown) mounted in vacuum housing 36. The adjustment of lens systems of this type is known in the art.

Using a mass analyzer comprising the VG Analytical 70–70S instrument adapted by the provision of the sampling system illustrated in FIGS. 2 and 3, and a plasma torch assembly similar to that used on the "Plasmaquad" manufactured by VG Elemental the inventors have routinely achieved a sensitivity of a factor of ten higher than a typical quadrupole-based ICP mass spectrometer at a resolution of about 500 (10% valley definition) and an ultimate resolution in excess of 8000. This permits the easy resolution of spectral interferences such as $^{56}$Fe and ArO (55.934938 and 55.957299) and $^{51}$V and $^{35}$Cl$^{16}$O (50.9439625 and 50.963766). Other important interferences which can be resolved include $^{28}$Si and $^{14}$N$_2$ and $^{32}$S and $^{16}$O$_2$, but these require resolutions of 2000 or less. Use of a isotopic ratio high resolution mass spectrometer fitted with a multiple channel detector in place of the simple detector illustrated in FIG. 1 further allows the determination of isotopic ratios with a precision very much better than has been previously possible in ICP mass spectrometers.

We claim:

1. A mass spectrometer for the analysis of a sample comprising means for establishing a plasma discharge in an inert gas by means of an electrical field energized by a radio-frequency or microwave generator; means for introducing said sample into said plasma discharge; a sampling cone disposed adjacent to said plasma and having an aperture in its apex; a mass analyzer disposed to receive at least some of the ions generated in said plasma which pass through said aperture; and means for maintaining the pressure on the side of said sampling cone remote from said plasma substantially below atmospheric pressure, characterized in that said mass analyzer comprises at least a magnetic sector analyzer having an entrance slit, and including means for maintaining a potential difference between said sampling cone and said entrance slit of such a magnitude that the energy of the ions after they have passed through said entrance slit permits their mass analysis by said magnetic sector analyzer.

2. A mass spectrometer according to claim 1 in which said plasma discharge is established substantially at atmospheric pressure.

3. A mass spectrometer according to claim 1 in which a skimmer cone is provided between said entrance slit and said sampling cone, means being provided for evacuating the region between said skimmer cone and said entrance slit and in which said sampling cone and said skimmer cone are maintained at approximately the same potential.

4. A mass spectrometer according to claim 3 in which said means for maintaining the pressure on the side of said sampling cone remote from said plasma comprise a mechanical vacuum pump capable of maintaining a pressure of less then 10 mm Hg, and said means for evacuating the region between the skimmer cone and said entrance slit comprises a diffusion pump capable of maintaining a pressure of $10^{-4}$ mm Hg or less.

5. A mass spectrometer according to claim 3 in which one or more electrostatic lenses are provided between said sampling cone and said entrance slit to enhance the transmission of ions from said cone to said slit.

6. A mass spectrometer according to claim 5 in which said entrance slit has a rectangular cross section and the aperture in said sampling cone has a circular cross section, and at least one of said electrostatic lenses comprises a multipole lens which changes the cross section of the ion beam from circular to substantially rectangular as it travels from said sampling cone to said entrance slit.

7. A mass spectrometer according to claim 3 in which said mass analyzer is a double-focusing mass analyzer comprising at least one electrostatic analyzer and at least one magnetic sector analyzer, and said potential difference is selected to ensure efficient transmission of said ions through said mass analyzer.

8. A mass spectrometer according to claim 3 in which said mass analyzer is a double-focusing mass analyzer comprising at least one electrostatic analyzer and at least one magnetic sector analyzer.

9. A mass spectrometer according to claim 3 in which said means for establishing a plasma comprises a radio-frequency power generator which supplies energy to said plasma via a load coil disposed around said plasma, and in which a point on said load coil is grounded.

10. A mass spectrometer according to claim 9 in which said point on said load coil is located on the turn closest to said sampling cone.

11. A mass spectrometer according to claim 1 in which the aperture in said sampling cone is sufficiently large for the boundary layer of cool gas which forms between said sampling cone and said plasma to be punctured.

12. A mass spectrometer according to claim 1 in which one or more electrostatic lenses are provided between said sampling cone and said entrance slit to enhance the transmission of ions from said cone to said slit.

13. A mass spectrometer according to claim 12 in which said entrance slit has a rectangular cross section and the aperture in said sampling cone has a circular cross section, and at least one of said electrostatic lenses comprises a multipole lens which changes the cross section of the ion beam from circular to substantially rectangular as it travels from said sampling cone to said entrance slit.

14. A mass spectrometer according to claim 12 in which said mass analyzer is a double-focusing mass analyzer comprising at least one electrostatic analyzer and at least one magnetic sector analyzer, and said potential difference is selected to ensure efficient transmission of said ions through said mass analyzer.

15. A mass spectrometer according to claim 1 in which said mass analyzer is a double-focusing mass analyzer comprising at least one electrostatic analyzer and at least one magnetic sector analyzer.

16. A mass spectrometer according to claim 1 in which said means for establishing a plasma comprises a radio-frequency power generator which supplies energy to said plasma via a load coil disposed around said plasma, and in which a point on said load coil is grounded.

17. A mass spectrometer according to claim 16 in which said point on said load coil is located on the turn closest to said sampling cone.

* * * * *

US005068534A

REEXAMINATION CERTIFICATE (2483rd)

United States Patent [19]

[11] B1 5,068,534

Bradshaw et al.

[45] Certificate Issued Feb. 14, 1995

[54] HIGH RESOLUTION PLASMA MASS SPECTROMETER

[75] Inventors: Neil Bradshaw, Stockport; Neil E. Sanderson, Sandiway, both of United Kingdom

[73] Assignee: Fisons Plc., Ipswich, England

Reexamination Request:
No. 90/003,385, Apr. 1, 1994

Reexamination Certificate for:

| | |
|---|---|
| Patent No.: | **5,068,534** |
| Issued: | **Nov. 26, 1991** |
| Appl. No.: | **623,401** |
| Filed: | **Jun. 5, 1989** |

[22] PCT Filed: Jun. 5, 1989

[86] PCT No.: PCT/GB89/00622

§ 371 Date: Dec. 3, 1990

§ 102(e) Date: Dec. 3, 1990

[87] PCT Pub. No.: WO89/12313

PCT Pub. Date: Dec. 14, 1989

[30] Foreign Application Priority Data

Jun. 3, 1988 [GB] United Kingdom ................. 8813149

[51] Int. Cl.⁶ ........................ B01D 59/44; H01J 49/00

[52] U.S. Cl. .................................... 250/288; 250/296; 250/298

[58] Field of Search ............... 250/288, 281, 296, 298, 250/423 R; 315/111.81

[56] References Cited

U.S. PATENT DOCUMENTS 4,480,187 10/1984 Matsuda .
4,682,026 7/1987 Douglas .
4,740,696 4/1988 Osawa .
4,746,794 5/1988 French .

FOREIGN PATENT DOCUMENTS 0112004 10/1983 European Pat. Off. .

OTHER PUBLICATIONS

Coburn et al, "Plasma Sources in Analytical Mass Spectrometry", Applied Spectroscopy Reviews, 17(1), 95–164, (1981).

Grange et al, "Medium Resolution Atmospheric Pressure Ionization Mass Spectrometer", Rev. Sci. Instrum., 59(4) 573–579 (Apr. 1988).

Gray, "The ICP As An Ion Source–Origins, Achievements and Prospects", Spectrochimic Acta, 40B, 1525–1537, (1985).

Gray, "Analysis of Inorganic Solids and Solutions by Plasma Source Mass Spectrometry", Advances in Mass Spectrometry, Wiley, 243–261, (1986).

Houk et al, "Inductively Coupled Argon Plasma as an Ion Source for Mass Spectrometric Determination of Trace Elements", Anal. Chem. 52, 2283–2289 (1980).

Houk, "Instrumentation", Anal. Chem., 58, No. 1, (List continued on next page.)

*Primary Examiner*—Bruce C. Anderson

[57] ABSTRACT

There is disclosed a double-focusing mass spectrometer in which ions are generated from a sample in a microwave-induced or inductively-coupled plasma (3). Ions are sampled from the plasma (3) through an aperture in a sampling cone (19) and pass through a skimmer cone (28) and several electrostatic lenses (30,33) to the entrance slit of the mass analyzer. The sampling cone (19) and skimmer cone (28) are maintained by a power supply (40) at a potential approximately equal to the accelerating potential required by the mass analyzer. It is found that the plasma potential may be maintained at such a value that a substantial proportion of the ions generated in the plasma (3) have energies lying within the energy passband of the mass analyzer, so that a high sensitivity, high resolution mass spectrometer especially suitable for the elemental analysis of solid or liquid samples is provided. Such a spectrometer is capable of resolving many of the spectral interferences which restrict the usefulness of conventional quadrupole based plasma mass spectrometers.

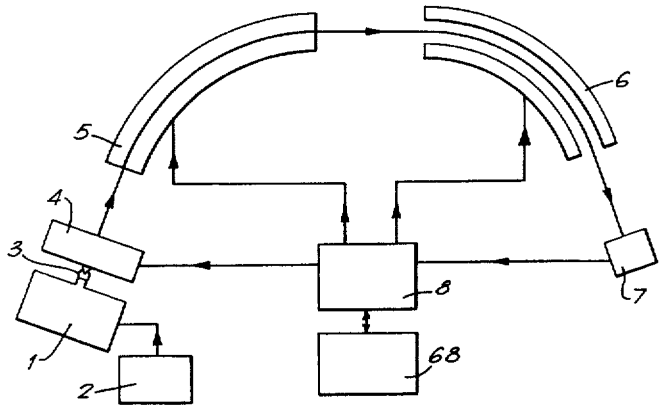

OTHER PUBLICATIONS

97A–105A, (1986) (Mass Spectrometry of Inductively Coupled Plasmas).

Houk et al, "Inductively Coupled Plasma Mass Spectrometry", Mass Spectrometry Reviews, 7, 425–461, (1988).

Sands, ICP-MS Symposium Abstract, ICP Information Newsletter, 13, 19–142, (Aug. 1987).

Knewstubb et al, "Mass-spectrometric Studies of Ionization in Flames", Proc. Roy., A 255, 520537, (1960).

Lehmann, Dissertation "Charge Reversal and Dissociation of Some Moderately Fast Positive Ions in Collision with Krypton Atoms", Fashbereich Physik, Universitat Hamburg, 1975, and partial translation.

Lehman, "Dissociation of $H_2$+ and $H_3$+ by Collision with Kr in the Energy Range Between 6 and 60 KeV", Z. Naturforsch, 31A, 1303–1307, (1976), and full translation.

McLafferty, "Mass Spectrometry of Organic Ions", Academic Press, New York and London, 255–307, (1963).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been delected and is no longer a part of the patent; matter printed in italics indicates additions made to the patent.

AS A RESULT OF REEXAMINATIN, IT HAS BEEN DETERMINED THAT:

Claim 2 is cancelled.

Claim 1 is determined to be patentable as amended.

Claims 3–17, dependent on an amended claim, are determined to be patentable.

1. A mass spectrometer for the analysis of a sample comprising means for establishing a plasma [discharge] in an inert gas [by] *substantially at atmospheric pressure, said plasma establishing means comprising* means [of] *for creating* an electrical field energized by a radio-frequency or microwave generator *and a plasma torch for supplying said inert gas into said field;* means for introducing said sample into said plasma [discharge] *to thereby ionize at least a portion of said sample*; a sampling cone disposed adjacent to said plasma and having an aperture in its apex; a mass analyzer disposed to receive a least some of the ions generated in said plasma which pass through said aperture; and means for maintaining the pressure on the side of said sampling cone remote from said plasma substantially below atmospheric pressure, charactrized in that said mass analyzer comprises at least a magnetic sector analyzer having an entrance slit, and including *means for maintaining the potential of said entrance slit substantially at ground potential, and* means for maintaining [a] *the* potential [difference between] *of* said sampling cone [and said entrance slit of] *at a potential with respect to ground potential which is approximately equal to the accelerating potential required by the mass analyzer to thereby raise the potential at which ions are formed in the plasma to* such a magnitude that the energy of the ions after they have passed through said entrance slit permits their mass analysis by said magnetic sector analyzer.

* * * * *